United States Patent Office 3,365,432
Patented Jan. 23, 1968

3,365,432
PROCESS FOR PRODUCING COPOLYMERS WITH INORGANIC SOLID POLYMERIZATION CATALYSTS
James C. MacKenzie, Wellesley Hills, and Adam Orzechowski, Waltham, Mass., assignors to Cabot Corporation, Boston, Mass., a corporation of Delaware
No Drawing. Filed May 8, 1963, Ser. No. 278,999
The portion of the term of the patent subsequent to Jan. 18, 1982, has been disclaimed
21 Claims. (Cl. 260—82.5)

This invention relates to the copolymerization of mono- and di-olefins with diverse polar monomers such as vinyl esters, vinyl ethers, halogen substituted mono- and di-olefins, acrylics, or formaldehyde.

Accordingly, it is a principal object of the present invention to provide a novel process for the copolymerization of alpha-mono- and di-olefins with diverse polar monomers.

Other objects of the present invention will in part be obvious and will in part appear hereinafter.

In accordance with the present invention, mono- and di-olefins are copolymerized with diverse polar monomers by catalysts comprising:

(a) The product of the reaction carried out under certain conditions between a halide-type compound of a metal of Group IVa, Va or VIa and a finely-divided particulate inorganic solid having surface hydroxyl groups thereon, and (b) An organometallic compound.

The copolymerization reaction can be effected at suitable temperatures within the range of from about —80° C. to about 250° C., and pressures ranging from below atmospheric upwardly to any desired maximum pressure.

Inorganic solids suitable for the purposes of the present invention generally include any inorganic compound which is available in finely-divided particulate form with hydroxyl groups on the surface thereof. For example, oxides such as alumina, zirconia, and silica, aluminates such as corundum, silicates such as chrysotile, and carbon blacks such as channel carbon blacks and furnace carbon blacks are all generally suitable for the purposes of the present invention. Inorganic solids having an average particle size of less than about 0.1 micron are, however, definitely preferred. It is pointed out that while carbon black is not generally included within the scope of the term, "inorganic solid," it is intended and therefore it should be understood that the term "inorganic solid" as utilized in the present specification and claims includes within its scope carbon black. In particular, inorganic solids having an average particle diameter of less than about 0.1 micron and having at least about $1 \times 10^{-4}$ equivalents per gram of hydroxyl groups chemically bound to the surface thereof, as set forth in more detail in U.S. application Ser. No. 2,861, filed Jan. 18, 1960, now abandoned, are preferred in accordance with the present invention.

Halide-type compounds of Group IVa, Va and VIa (hereinafter generally referred to as transition metal halides) suitable for the purposes of the present invention are the compounds conforming to the general empirical formula:

$$TO_aX_b$$

wherein T is a metal of Groups IVa, Va or VIa (where the group numbers correspond to the Mendeleev Periodic System); O is oxygen; $a$ is a number from 0 to 2; each X is any halogen; and $b$ is a number from 1 to 6.

Examples of suitable compounds conforming to said general formula are halides such as zirconium tetrachloride, vanadium tetrachloride, and titanium tetraiodide and oxyhalides such as chromium oxychloride and vanadium oxychloride.

The conditions under which reaction between the transition metal halide and the finely-divided inorganic solid can be accomplished are subject to considerable variation. However, in order to obtain a catalyst component with exceptionally high activity and reproducible character and performance, it has been found to be all important that the finely-divided inorganic solid be essentially dry and anhydrous (i.e., free of molecular water in any form) at the time it is brought into contact with the transition metal halide. In addition, it is recommended that the reaction of the inorganic solid and the transition metal halide be accomplished so as to allow gaseous by-products of the reaction to be eliminated from the reaction zone in order to thereby insure that said reaction goes to completion. Generally, the said reaction can be carried out by contacting said inorganic solid with said transition metal halide, preferably in a solution thereof in an inert hydrocarbon medium, and maintaining the two reactants in intimate contact for a period of time sufficient to effect the desired chemical reaction resulting in the chemical bonding of the transition metal to the inorganic solid. The length of time required to effect a given amount of such reaction and chemical bonding is largely dependent upon the temperature of the reaction mixture and the rate of removal of the gaseous by-products. Generally speaking, almost any temperature between about 0° C. and 300° C. and even higher temperatures can be used satisfactorily, but room temperature to about 105° C. is generally preferred. Assuming provision is made for intimate contact of the dry inorganic solid and the transition metal halide, the *minimum* time required to accomplish the chemical reaction will vary from periods of the order of about 10 hours at room temperature to periods of the order of about 1 minute at temperatures of 100° C. or over. Temperatures substantially higher than about 300° C., e.g., 500° C., are completely needless and therefore of little or no interest.

Elimination of by-products of the reaction from the reaction zone, i.e., from the reaction medium, can be accomplished in any convenient manner such as, by sweeping the reaction vessel with an inert gas, by carrying out the reaction at sufficiently elevated temperatures while stirring to drive off by-products, and by complexing or reacting said by-products with suitable substances such as tertiary amines, tertiary arsines, tertiary phosphines, terpenes, terpinenes, tetrasubstituted hydrazines, carbides such as calcium carbide, and other substances which will react or complex with said by-products and thereby eliminate them.

Organometallic compounds suitable for the purposes of the present invention are the compounds chosen from the group consisting of:

(a) Compounds conforming to the empirical formula $$MM'_vX_nR_y$$

wherein M is a metal chosen from Groups I, II and III of the Periodic Table; M' is a metal of Group I of the Periodic Table; $v$ is a number from 0 to 1; each X is any halogen; $n$ is a number from 0 to 3; each R is any monovalent hydrocarbon radical or hydrogen; $y$ is a number from 1 to 4; and (b) Compounds conforming to the empirical formula $$R'_pH_mSO_{\frac{4-(m+p)}{2}}$$

wherein each R' is chosen from the group consisting of monovalent hydrocarbon radicals, monovalent alkoxy radicals, monovalent aryloxy radicals, and the halogens; $p$ is a number from 0 to 3; each H is a hydride radical;

$m$ is a number from 1 to 4; S is chosen from the group consisting of quadrivalent silicon, germanium, tin and lead; and O is oxygen.

Specific examples of R' groups for substitution in the above formula include methyl; 2-methyl-2-butenyl; n-dodecyl; 4-cyclohexylethyl; methylnaphthylethyl; 2,2,1-bicycloheptyl, tolyl; xylyl; xenyl; methoxy; isobutoxy; n-octyloxy; phenoxy and 1,2-naphthoxy.

Specific examples of compounds conforming to the formula $$R'_p H_m SO_{\frac{4-(m+p)}{2}}$$

which are suitable for the purposes of the present invention are silane, $SiH_4$;
ethylsilane, $H_3SiC_2H_5$;
diethylmonochlorosilane, $HSiCl(C_2H_5)_2$;
dichlorosilane, $H_2SiCl_2$;
methyldiethylsilane, $HSi(C_2H_5)_2CH_3$;
trimethoxysilane, $HSi(OCH_3)_3$;
tribenzylsilane, $HSi(CH_2C_6H_5)_3$;
dicyclohexylphenylsilane, $HSiC_6H_5(C_6H_{11})_2$;
triphenoxysilane, $HSi(OC_6H_5)_3$;
triphenylgermane, $(C_6H_5)_3GeH$;
tricyclohexylgermane, $(C_6H_{11})_3GeH$;
tribenzylgermane, $(C_6H_5CH_2)_3GeH$;
ethylisoamylgermane, $(C_2H_5)(i-C_5H_{11})GeH_2$;
dibutylstannane, $(C_4H_9)_2SnH_2$;
diisopropylstannane, $(i-C_3H_7)_2SnH_2$;
tripentylstannane, $(C_5H_{11})_3SnH$;
n-butylgermane, n-$C_4H_9GeH_3$;
triphenylplumbane, $(C_6H_5)_3PbH$;
triethoxystannane, $(C_2H_5O)_3SnH$;
1,2-dihydrotetramethylstannoxane,
   $(CH_3)_2HSnOSnH(CH_3)_2$;
cyclic alkyl hydrogen silicones such as $(CH_3HSiO)_6$ and linear alkyl hydrogen silicones such as $$(CH_3)_2HSiOSiH(CH_3)_2$$

Organometallic compounds which conform to the formula $$MM'_v X_n R_y$$

and which are suitable for the practice of the invention include compounds conforming to the subgeneric formula $$M(R)_k$$

wherein M is a Group I, II or III metal, such as sodium, beryllium, boron, aluminum and gallium; wherein $k$ is a number from 1 to 3 depending upon the valency of M; and wherein each R may be hydrogen or any monovalent hydrocarbon radical. Examples of suitable hydrocarbon radicals include aryl or alkaryl radicals, aliphatic hydrocarbon radicals, or derivatives, such as alkyl, cycloalkenylalkyl, arylalkyl, alkylcycloalkyl and cycloalkylalkenyl.

Specific examples of R groups for substitution in the above formula include methyl, isobutyl, hexyl, n-dodecyl, 2-methyl-2-butenyl, 4-bicycloheptyl, dimethylcyclohexyl, 5-cyclopentadienyl, phenylcyclohexyl, tolyl, xylyl, xenyl, and dimethylnaphthyl.

Specific compounds conforming to the empirical formula $$MM'_v X_n R_y$$

and which are therefore suitable for the purposes of the present invention are organo compounds such as butyllithium, di-p-tolylmercury, tri-n-amylboron, triisobutylaluminum, diisobutylaluminum bromide, phenylmercuric iodide, hexylcupric chloride, octylmagnesium hydride, triethyllithium aluminum bromide and sodiumdiphenyllithium. Definitely preferred, however, are the aluminum alkyls such as aluminum triisobutyl.

Further specific examples of suitable organometallic compounds conforming to the formula $$MM'_v X_n R_y$$

can be found in copending U.S. application, Ser. No. 2,861, filed Jan. 18, 1960, by Orzechowski and MacKenzie, now abandoned.

It is pointed out that catalysts formed with certain of the organometallic compounds such as the silanes, for example, require activation by heating, in the case of the silanes to temperatures above about 100° C. and preferably above about 130° C. for at least about 1 hour. At higher temperatures, shorter periods of time are required. At substantially lower temperatures, the catalyst is either not formed at all or is of inferior quality. The temperatures that need be utilized in activating the catalyst with any particular combination of components can be readily determined bearing in mind that normally temperatures between about 0° C. and 150° C. are needed to form catalysts comprising silane and/or germane and that temperatures (or pressures) that cause substantial decomposition of either of the components of the catalyst should be avoided.

Although it is appreciated that when R or R' in the above empirical formulae do not comprise at least one hydrocarbon radical, the resulting compounds cannot normally be termed organometallic compounds, compounds lacking at least one hydrocarbon radical comprise such a relatively small number of compounds included by said general formulae that for the purposes of the present invention, it is intended that these compounds be included within the generic term, organometallic compound. Accordingly, in the specification and in the claims, it is intended, and therefore, it should be understood, that the term, organometallic compound, refers to all the compounds included within the scope of the above defined general formulae. In addition, it is pointed out that while, strictly speaking, silicon and germanium are not metals, it is intended, and therefore it should be understood, that for the purposes of the present specification and claims, silicon and germanium are metals and the term organometallic includes within its scope, silicon and germanium compounds within the scope of the above formula, $$R'_p H_m SO_{\frac{4-(m+p)}{2}}$$

Specific examples of mono- and di-olefins suitable for the purposes of the present invention are compounds such as ethylene; propylene; 1,3-butadiene; pentene-1; 1,3-hexadiene; 1,5-hexadiene, isoprene and the like.

Monomers suitable for copolymerization with said mono- and di-olefinic monomers include:

(a) Vinyl esters conforming to the formula:

$$H_2C=C-O-C-R''$$
$$\phantom{H_2C=}|\phantom{-O-}\|$$
$$\phantom{H_2C=}Q\phantom{-O-}O$$

wherein H is hydrogen; Q is chosen from the group consisting of hydrogen, any hydrocarbon radical having 1 to 3 carbon atoms and any substituted hydrocarbon group having 1 to 3 carbon atoms; and R'' is chosen from the group consisting of any hydrocarbon radical and halogen-substituted hydrocarbon radicals having 1–18 carbon atoms. Specific examples of vinyl esters within the scope of the present disclosure are vinyl chloroacetate; vinyl propionate; vinyl butyrate; vinyl benzoate; vinyl acetate; vinyl formate; vinyl 2-ethyl butyrate; vinyl crotonate; vinyl dichlorobenzoate and 1-methyl-vinyl butyrate;

(b) Halogen-substituted α-mono- and di-olefinic hydrocarbons conforming to the formula:

$$CH_c X_d = C'H_e X_f$$

wherein each H is hydrogen; $c$ is a number from 0 to 2; each X is any halogen; $d$ is a number from 1 to 2; $c+d=2$; C' is any aliphatic, alicyclic or aromatic carbon chain which contains 1–18 carbon atoms; $e$ is a number from 0 to 36; $f$ is a number from 1 to 6; and wherein $f+d$ equals at least one. Specific halogen-substituted α-mono- and di-olefinic hydrocarbons included are 1,2-difluoroethylene; 1,3-dichloropropene; 3,3-dibromo-1-fluoropropene; 1,6-dichloro-1,5-hexadiene; 2-fluoro-1,3-butadiene; vinyl chloride; tetrafluoroethylene; 2-methyl-1-chloropropene; 1,6-difluoro-8-iodo-1-pentadecene and 1-vinyl-4-chloronaphthalene;

(c) Acrylic monomers conforming to the formula:

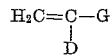

wherein D is chosen from the group consisting of hydrogen, any halogen, methyl, ethyl and propyl radicals; and G is a functional group chosen from the group consisting of carbalkoxy (—COOR) wherein the hydrocarbon radical has a length of one to eighteen carbon atoms; carbamoyl (—CONH$_2$); N-substituted carbamoyl (—CONHR, —CONR$_2$); wherein the hydrocarbon radicals have a length of one to eighteen carbon atoms; formyl (—CHO); cyano (—CN); and acyl (—COR) wherein the hydrocarbon radical has a length of one to eighteen carbon atoms. Specific examples of suitable acrylic monomers are N-methyl acrylamide; isopropyl acrylate; methyl methacrylate; acrylonitrile; acrolein; ethylacrylate; methyl vinyl ketone and α-chlorovinyl methyl ketone;

(d) Vinyl ethers conforming to the formula:

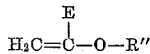

wherein E is chosen from a group consisting of hydrogen, any halogen, and any hydrocarbon radical having a length of one to eighteen carbon atoms; and R" is chosen from the group consisting of any hydrocarbon radical and halogen-substituted hydrocarbon radical having a length of one to eighteen carbon atoms. Specific vinyl ethers within the scope of the present disclosure are vinyl methyl ether; vinyl isobutyl ether; vinyl n-butyl ether; vinyl 2-chloroethyl ether; divinyl ether and vinyl ethyl ether; and (e) Formaldehyde: It should be noted that the compounds paraformaldehyde and trioxane are low polymers of formaldehyde, trioxane being a cyclic trimer and paraformaldehyde a low linear polymer of from 2 to about 100 monomeric units. Generally, the first step in the polymerization of these materials is a depolymerization procedure, the actual copolymerization reaction being of the pure monomer, formaldehyde. Hence, it is intended that the term, "formaldehyde," as utilized herein include both trioxane and paraformaldehyde.

Using the catalysts of this invention, copolymerization of mono- and di-olefins with diverse polar monomers can often be accomplished in the absence of liquids (other than the monomers themselves) solvents or diluents, for example, in the gas phase, but it is usually more convenient to effect copolymerization in the presence of a substantially inert liquid reaction medium. Accordingly, an inert liquid reaction medium is preferably supplied to the reaction zone.

Several classes of hydrocarbons or their mixtures which are liquid and substantially inert under the copolymerization conditions of the present process constitute suitable liquid reaction media. Thus, various classes of saturated hydrocarbons such as pure alkanes or cycloalkanes or commercially available mixtures, freed of harmful impurities, are suitable for the purposes of the present invention. For example, straight run naphthas or kerosenes containing alkanes and cycloalkanes and liquid or liquefied alkanes such as n-hexane, 2,3-dimethylbutane, n-dodecane, dimethylcyclopentane, methyldecalins, and the like are suitable. Also, members of the aromatic hydrocarbon series, such as isopropyl benzene, ethyltoluene, hemimellitene, pseudocumene, isodurene, isoamylbenzene, and particularly the mononuclear aromatic hydrocarbons such as xylenes, mesitylene and xylene-p-cymene mixtures, and the like are completely suitable.

The proportion of surface reacted particulate inorganic solid to organometallic compound utilized in preparing the catalyst is not usually a critical feature of the process. We have found from experience that a molar ratio of from about 0.1 to 5 millimoles of the organometallic compound per milliatom of transition metal chemically combined to the surface of the finely-divided solid is to be preferred.

The quantity of catalyst, i.e., comprising both the surface reacted finely-divided solid and the organometallic compound, to be utilized in the copolymerization reaction may vary, but in general, the total quantity of catalyst that need be employed based on the weight of the charging stock is very small particularly when a very fine particle size oxide is utilized as the inorganic solid.

The contact time or space velocity employed in the copolymerization process will be selected with reference to the other process variables such as the particular catalysts utilized, the specific type of product desired, and the extent of monomer conversion, desired in any given run or pass over the catalyst. In general, this variable is readily adjustable to obtain the desired results.

There follow a number of illustrative non-limiting examples:

*Example 1*

To a 2,000-milliliter, three-neck, glass reaction vessel equipped with a stirrer, a condenser and nitrogen inlet and outlet tubes, there is added 15 grams of "Cab-O-Sil," a pyrogenic silica produced by Cabot Corporation, which has an average particle diameter of about 10 millimicrons and a hydroxyl group content on the surface thereof about 1.5 milliequivalents per gram. To said reaction vessel there is added 1450 milliliters of benzene, and the resulting translucent slurry is dried by being heated to, and maintained at, the boiling point of benzene, i.e., about 80° C., for about 20 hours, while a water/benzene azeotrope is removed from the reaction vessel by periodic distillation until about 450 milliliters of distillate has been removed. The vessel is then cooled and charged with 15 millimoles of titanium tetrachloride. The resulting slurry is then refluxed for about 6 hours with continuous stirring while said slurry is continuously swept with a stream of dry nitrogen. Subsequently, the extent of the reaction between the titanium tetrachloride and the hydroxyl groups in the surface of the silica is determined by measuring the quantity of HCl that was produced and by testing the liquid contents of the vessel for the absence therein of titanium tetrachloride, and the said silica is found to have 15 milliatoms of titanium chemically bound to the surface thereof. 2 grams of this silica containing about 2 milliatoms of titanium chemically bound to the surface thereof, and suspended in about 133 milliliters of anhydrous benzene is then transferred without exposure to the atmosphere from this reaction vessel to a one liter stirred autoclave which has been previously flushed with dry nitrogen. Next, 2 millimoles of triethylaluminum are added, and the contents of said reaction vessel are vigorously stirred at ambient temperatures for about 1 hour. Thereafter, there is charged to said vessel 200 milliliters of anhydrous benzene and 150 millimoles of vinyl chloride, followed by pressurization to 75 p.s.i. with propylene. The autoclave is then heated to, and maintained at, about 80° C. with continuous stirring for about 24 hours. The reaction product is analyzed and it is found that about 3.5 grams of vinyl chloride-propylene copolymer have been produced.

*Example 2*

66.7 milliliters of the cocatalyst slurry produced in Example 1, containing about 1 millimole of titanium chemically bound to about 1 gram of silica is charged into a 500-milliliter stainless steel reaction bomb which has been previously flushed with dry nitrogen. Next, 3 millimoles of triethylsilane are charged into said bomb.

The bomb is then sealed and heated to and maintained at, about 150° C. with continuous agitation for about 1 hour. The reaction bomb is then cooled to ambient temperatures (20-25° C.) and there is introduced thereinto 50 millimoles of vinyl-n-butyl ether and 100 millimoles of ethylene. Next, said bomb is resealed, heated to and maintained at about 100° C. and continuously agitated for about 10 hours. The reaction product is analyzed and it is found that a vinyl-n-butyl-ether-ethylene copolymer has been produced.

When under the same conditions either the triethylsilane or the silica cocatalyst carrying titanium chemically combined to the surface thereof is utilized alone as the catalyst no solid copolymer is produced.

*Example 3*

To a 2,000-milliliter, three-neck, glass reaction vessel equipped with a stirrer, a condenser and nitrogen inlet and outlet tubes, there is added 15 grams of "Supercarbover," a channel carbon black produced by Cabot Corporation, which has an average particle diameter of about 14 millimicrons and a hydroxyl group content on the surface thereof of about 1.6 milliequivalents per gram. To said reaction vessel there is added 1800 milliliters of benzene and the resulting slurry is dried by being heated to, and maintained at, the boiling point of benzene, i.e., about 80° C., for about 24 hours while a water/benzene azeotrope is removed from the reaction vessel by periodic distillation until about 600 milliliters of distillate has been removed. The vessel is then cooled and charged with 15 millimoles of zirconium tetrabromide. The resulting slurry is then refluxed for 20 hours with continuous stirring while the HBr produced is removed by a stream of dry nitrogen. Subsequently, the extent of the reaction between the zirconium tetrabromide and the hydroxyl groups on the carbon black is determined by measuring the quantity of HBr that was produced and by testing the liquid contents of the vessel for the absence therein of zirconium tetrabromide, and the said carbon black is found to have 15 milliatoms of zirconium chemically bound to the surface thereof. A sample of 80 milliliters of this slurry containing about 1 milliatom of zirconium bound to the surface of about 1 gram of carbon black, is then transferred from this reaction vessel to a one liter stirred autoclave which has been previously flushed with dry nitrogen. Next, there is added to said autoclave 1 millimole of triisobutylaluminum in 600 milliliters of anhydrous benzene and the resulting slurry is then vigorously agitated for about 1 hour at ambient temperatures. Next, there is charged into said autoclave 100 millimoles of acrylonitrile monomer and 300 millimoles of 1,3-butadiene. Said autoclave is then heated to, and maintained at, about 80° C. with continuous stirring for about 24 hours. The reaction product is analyzed and it is found that a butadiene-acrylonitrile copolymer has been produced.

*Example 4*

To a 1,000-milliliter, three-neck, glass reaction vessel there is added 10.6 grams of "Alon," a pyrogenic alumina produced by Deutsche Gold-Und Silber-Scheideanstalt Vormals Roessler and which has an average particle diameter of about 10-40 millimicrons and a hydroxyl group content on the surface thereof of about 0.7 milliequivalent per gram. Said reaction vessel is then placed in a vacuum drying oven heated to a temperature of about 110° C. for about 15 hours. Subsequently, the vessel is sealed without exposing said alumina to the atmosphere and there are charged to said vessel 5 millimoles of vanadium oxytrichloride in 600 milliliters of isooctane. The vessel is then continuously stirred, and maintained at a temperature of about 98° C. for a period of about 10 hours. Subsequently, the extent of the reaction between the vanadium oxytrichloride and the alumina is determined by measuring the quantity of HCl that was produced and by testing the liquid contents of the vessel for the absence therein of vanadium oxytrichloride and the said alumina is found to have 5 milliatoms of vanadium chemically bound to the surface thereof. 240 milliliters of this slurry containing 4.24 grams of alumina, and 2 milliatoms of vanadium is then transferred from this reaction vessel to a one liter stirred stainless steel autoclave which has been previously flushed with dry nitrogen. Next, 5 millimoles of tri-i-propyl stannane are charged thereinto and the autoclave is then continuously vigorously agitated at ambient temperatures for about 36 hours. 250 millimoles of vinylidene chloride monomer are then charged to the autoclave followed by pressurization of said autoclave to 200 p.s.i. with ethylene. Thereafter, the autoclave is heated to and maintained at, about 80° C. with continuous stirring for about 12 hours. The reaction product is analyzed and it is found that a vinylidene chloride-ethylene copolymer has been produced.

When, under the same conditions either the tri-i-propyl stannane or the alumina cocatalyst bearing vanadium chemically combined to the surface thereof is utilized alone as the catalyst no copolymer is produced.

*Example 5*

To a 1-liter, stainless steel, stirred autoclave, there is added 240 milliliters of the cocatalyst slurry produced in Example 4 containing about 2 milliatoms of vanadium chemically bound to the surface of about 4.24 grams of alumina. Next, there is introduced into said autoclave about 2 millimoles of triisobutylaluminum in 100 milliliters of anhydrous isooctane and 300 millimoles of 1,3,5-trioxane. The autoclave is then pressurized with ethylene to a total pressure of about 150 p.s.i., and is then heated to, and maintained at, about 135° C. with continuous stirring for about 12 hours. The reaction product is analyzed and it is found that an ethylene-acetal copolymer has been produced.

The polymers and copolymers produced by the process of this invention can be subjected to such aftertreatment as may be desired to fit them for particular uses or to impart desired properties. Thus, said polymers and copolymers can be extruded, mechanically milled, filmed or cast, or converted to sponges or latices. Also, antioxidants, stabilizers, fillers such as carbon black and silicas, extenders, plasticizers, pigments, insecticides, fungicides, etc., can be incorporated therein.

Obviously, many changes may be made in the above-described examples and procedure without departing from the scope of the invention. For example, although only transition metal chlorides and bromides are mentioned in the above examples, transition metal iodides and fluorides are also suitable for the purposes of the present invention. For example, titanium tetrafluoride is entirely suitable.

Also, pyrogenically coformed, or coprecipitated metal oxides, or metal oxides coformed with, or mixed with, other compounds are suitable finely-divided inorganic solids for the purposes of the present invention.

Accordingly, it is intended that the above disclosure be regarded as illustrative and as in no way limiting the scope of the invention.

What we claim is:

1. A process for copolymerizing a substance chosen from the group consisting of a mono-olefin, mixtures of mono-olefins, a di-olefin, mixtures of di-olefins, and mixtures thereof with a monomer chosen from the group consisting of (a) vinyl ester monomers conforming to the formula:

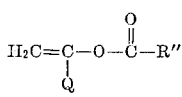

wherein Q is chosen from the group consisting of hydrogen, any hydrocarbon radical having 1 to 3 carbon atoms, and any substituted hydrocarbon group having 1 to 3 carbon atoms; and R" is chosen from the group consisting of any hydrocarbon radical and halogen-substituted hydrocarbon radicals having 1–18 carbon atoms;

(b) halogen-substituted α-mono- and di-olefinic hydrocarbons conforming to the formula:

$$CH_cX_d=C'H_eX_f$$

wherein each H is a hydrogen; $c$ is a number from 0 to 2; each X is any halogen; $d$ is a number from 0 to 2; $c+d=2$; C' is any aliphatic alicyclic or aromatic carbon chain which contains 1–18 carbon atoms; $e$ is a number from 0 to 36; $f$ is a number from 0 to 6; and wherein $f+d$ equals at least one;

(c) acrylic monomers conforming to the formula:

$$H_2C=\underset{D}{C}-G$$

wherein D is chosen from the group consisting of hydrogen, any halogen, methyl, ethyl and propyl radicals; and G is a functional group chosen from the group consisting of carbalkoxy (—COOR) wherein the hydrocarbon radical has a length of one to eighteen carbon atoms; carbamoyl (—CONH$_2$); N-substituted carbamoyl (—CONHR, —CONR$_2$) wherein the hydrocarbon radicals have a length of one to eighteen carbon atoms; formyl (—CHO); cyano (—C≡N); and acyl (—COR) wherein the hydrocarbon radical has a length of one to eighteen carbon atoms; and (d) vinyl ether monomers conforming to the formula:

$$H_2C=\underset{|}{\overset{E}{C}}-O-R''$$

wherein E is chosen from a group consisting of hydrogen, any halogen, and any hydrocarbon radical having a length of one to eighteen carbon atoms; and R'' is chosen from the group consisting of any hydrocarbon radical and halogen-substituted hydrocarbon radical having a length of one to eighteen carbon atoms;

(e) formaldehyde; which comprises contacting said substance and said monomer at temperatures between about −80° C. and 250° C., with a catalyst comprising (a') a finely-divided inorganic solid having an average particle diameter of less than about 0.1 micron and carrying in chemical combination on the surface thereof at least about $1 \times 10^{-4}$ equivalents per gram of structures conforming to the formula $$TO_aX_b$$

where T is a metal chosen from the group consisting of the metals of Groups IV$a$, V$a$ and VI$a$; O is oxygen; $a$ is a number from 0 to 2; each X is any halogen; and $b$ is a number from 1 to 5; and where said structures are chemically linked directly from T to at least one oxygen atom in the surface of said solid; and (b') an organometallic compound chosen from the group consisting of compound conforming to empirical formulae (1) $$MM'_vX_nR_y$$

where M is chosen from the group consisting of the metals of Groups I, II and III; M' is a metal of Group I; $v$ is a number from 0 to 1; each X is any halogen; $n$ is a number from 0 to 3; each R is chosen from the group consisting of any monovalent hydrocarbon radical and hydrogen; $y$ is a number from 1 to 4; and (2) $$R'_pH_mSO_{\frac{4-(m+p)}{2}}$$

wherein each R' is chosen from the group consisting of hydrocarbon radicals, alkoxy radicals, aryloxy radicals and the halogens; $p$ is a number from 0 to 3; each H is a hydride radical; $m$ is a number from 1 to 4; S is a quadrivalent metal chosen from the group consisting of germanium, tin, lead and silicon; and O is oxygen.

2. The process of claim 1 wherein the monomer copolymerized with said substance chosen from the group consisting of a mono-olefin, mixtures of mono-olefins, a di-olefin, mixtures of di-olefins, and mixtures thereof, conforms to the formula $$H_2C=\underset{Q}{\overset{}{C}}-O-\overset{O}{\overset{\|}{C}}-R''$$

3. The process of claim 1 wherein the monomer copolymerized with said substance chosen from the group consisting of a mono-olefin, mixtures of mono-olefins, a di-olefin, mixtures of di-olefins, and mixtures thereof conforms to the formula $$CH_cX_d=C'H_eX_f$$

4. The process of claim 1 wherein the monomer copolymerized with said substance chosen from the group consisting of a mono-olefin, mixtures of mono-olefins, a di-olefin, mixtures of di-olefins, and mixtures thereof conforms to the formula $$H_2C=\underset{D}{C}-G$$

5. The process of claim 1 wherein the monomer copolymerized with said substance chosen from the group consisting of a mono-olefin, mixtures of mono-olefins, a di-olefin, mixtures of di-olefins, and mixtures thereof conforms to the formula $$H_2C=\underset{|}{\overset{E}{C}}-O-R''$$

6. The process of claim 1 wherein the monomer copolymerized with said substance chosen from the group consisting of a mono-olefin, mixtures of mono-olefins, a di-olefin, mixtures of di-olefins, and mixtures thereof, is formaldehyde.

7. The process of claim 1 wherein the monomers copolymerized are butadiene and acrylonitrile.

8. The process of claim 1 wherein the monomers copolymerized are ethylene and vinyl acetate.

9. The process of claim 1 wherein in the formula $$TO_aX_b$$

$a$ is 0.

10. The process of claim 1 wherein in the formula $$TO_aX_b$$

$a$ is 0 and $b$ is 3.

11. The process of claim 1 wherein in the formula $$TO_aX_b$$

$a$ is 0 and each X is chlorine.

12. The process of claim 1 wherein in the formula $$TO_aX_b$$

each X is chlorine.

13. The process of claim 1 wherein in the formula $$TO_aX_b$$

T is a metal of Group IV$a$.

14. The process of claim 1 wherein in the formula $$TO_aX_b$$

T is titanium.

15. The process of claim 1 wherein in the formula $$TO_aX_b$$

T is zirconium.

16. The process of claim 1 wherein in the formula $$TO_aX_b$$

T is a metal of Group V$a$.

17. The process of claim 1 wherein in the formula $$TO_aX_b$$

T is vanadium.

18. The process of claim 1 wherein in the formula $$TO_aX_b$$

T is a metal of Group VIa.

19. The process of claim 1 wherein said organometallic compound conforms to the formula $$MM'_vX_nR_y$$

20. The process of claim 1 wherein said organometallic compound is an aluminum alkyl.

21. The process of claim 1 wherein said organometallic compound is a trialkyl silane.

References Cited

UNITED STATES PATENTS

| 2,910,461 | 10/1959 | Nowlin et al. | 260 |
| 3,131,171 | 4/1964 | Calfee | 260—80.7 |
| 3,166,542 | 1/1965 | Orzechowski et al. | 260—94.9 |

FOREIGN PATENTS 592,111  4/1959  Italy.

JOSEPH L. SCHOFER, *Primary Examiner.*

H. I. CANTOR, *Assistant Examiner.*